United States Patent

Hoppe et al.

[11] Patent Number: 4,715,749
[45] Date of Patent: Dec. 29, 1987

[54] PNEUMATIC TRANSPORT CONVEYOR

[75] Inventors: Hans Hoppe, Vogt; Dieter Heep, Bergatreute; Norbert Eberhard, Ertingen; Werner Miller, Ravensburg, all of Fed. Rep. of Germany

[73] Assignee: Waeschle Maschinenfabrik GmbH, Ravensburg, Fed. Rep. of Germany

[21] Appl. No.: 785,844

[22] Filed: Oct. 9, 1985

[30] Foreign Application Priority Data

Oct. 12, 1984 [DE] Fed. Rep. of Germany ....... 3437560

[51] Int. Cl.⁴ .............................................. B65G 53/66
[52] U.S. Cl. ........................................ 406/14; 406/95; 138/39; 138/148
[58] Field of Search .................................. 406/93–95, 406/85, 191, 193, 195, 196, 14; 137/13; 138/39, 103, 148, 155; 285/55, 161, 158, 368

[56] References Cited

U.S. PATENT DOCUMENTS

| 591,431 | 10/1897 | Smith | 285/158 |
|---|---|---|---|
| 1,018,354 | 2/1912 | Fairfield | 285/158 |
| 2,478,326 | 8/1949 | Scarth | 406/193 |
| 2,733,105 | 1/1956 | Williams | 406/195 |
| 2,919,936 | 1/1960 | Hurley | 285/55 |
| 3,253,841 | 5/1966 | Ahmad | 285/55 |
| 3,929,379 | 12/1975 | Krambrock | 406/95 |

FOREIGN PATENT DOCUMENTS 2550164 5/1977 Fed. Rep. of Germany .

Primary Examiner—Andres Kashnikow
Assistant Examiner—Karen B. Merritt
Attorney, Agent, or Firm—Murray Schaffer

[57] ABSTRACT

A transport conduit for bulk material is formed of a rigid outer tube and an elastic inner tube of substantially smaller diameter. The inner tube is hermetically sealed at each of its ends to the conduit section so as to form a closed annular chamber between the inner elastic tube and the rigid outer tube. Communicating through the wall of both the outer and inner elastic tubes are relief and check valves sealed with respect to the elastic inner tube so as to maintain the integrity of the annular chambers. The valves are connected to a secondary gas supply from which air under pressure is directed into the conduit to assist in the transport of the bulk material. The annular chambers are serially connected by bridging tubes passing from one section to the adjacent section, thereby interconnecting each of the annular chambers in an outer parallel conduit to permit atmospheric air to move serially through them from one end of the transport conveyor to the other.

7 Claims, 4 Drawing Figures

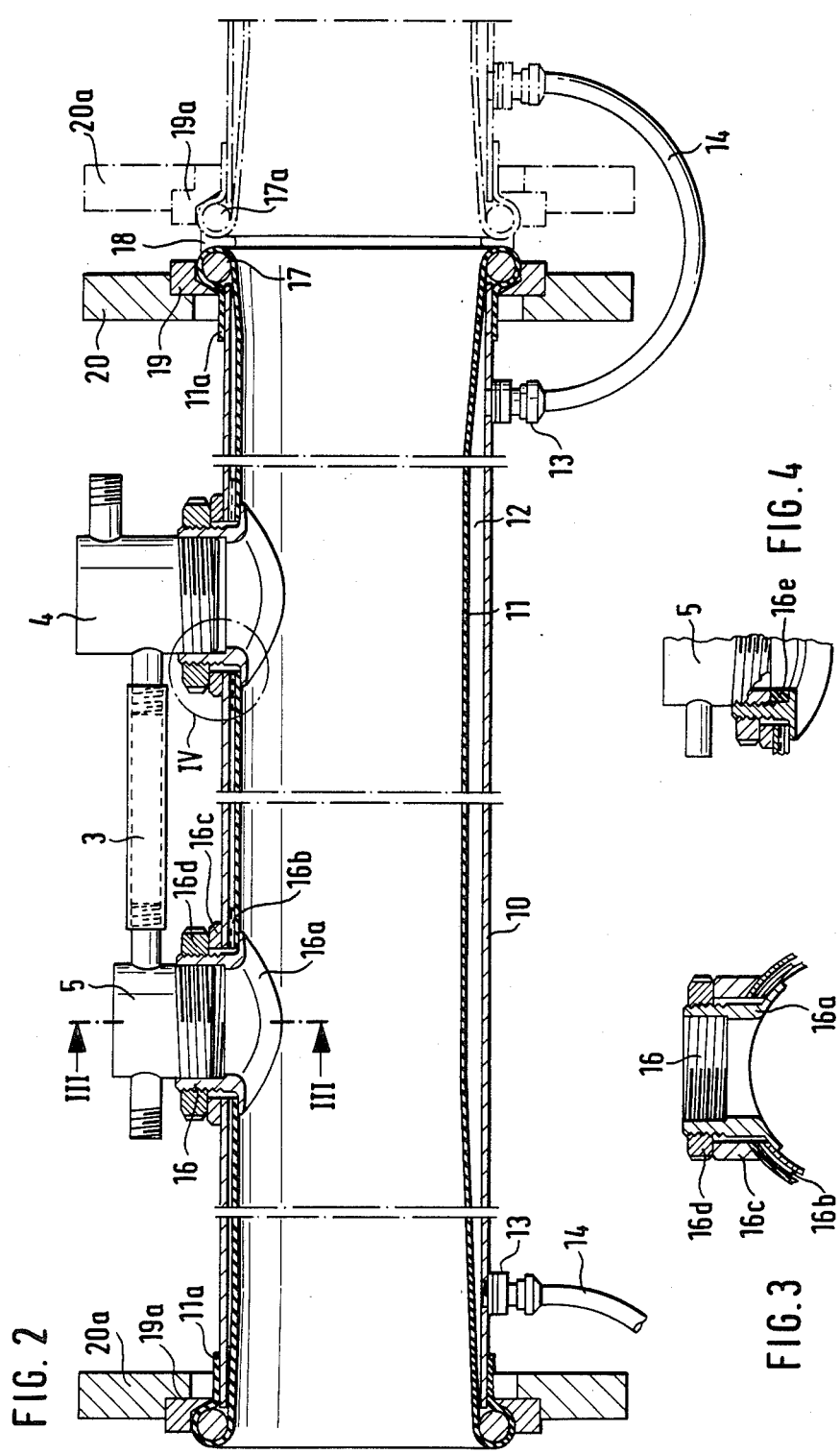

PNEUMATIC TRANSPORT CONVEYOR

BACKGROUND OF THE INVENTION

The present invention relates to a system, for the pneumatic transport of bulk material such as comminuted or powdered solids.

In a more or less conventional installation, shown in German Patent Specification No. 25 50 164, bulk material is transported through a pneumatic conduit conveyor having a parallel secondary gas line which is connected, at selected intervals to the conduit by check and relief valves. The valves are responsive to a difference in pressure between that in the conduit and that in the secondary gas line, occuring for example, from compaction of the bulk material within the conduit or from some other obstruction in the conveyor itself. The valves divert pressurized gas from the secondary line into the conveyor close to the area of the compaction our obstruction to thus effect a targeted clearance of the transport conveyor.

Although it is possible to thus move bulk materials, which are normally difficult to handle, without any problem, the known installation is overtaxed if the bulk materials are of an adhesive, and particularly sticky character and/or have the tendency to deposit themselves on the inside wall of the conduit. With such material, the conduit gradually becomes blocked by the build-up of the material on the wall, which deposit, from time to time flakes off in large blocks, causng a more severe blockage of the conduit. The deposits frequently result in undesirable product mixture particularly when the form or nature of the product, being transported, is changed.

In U.S. Pat. No. 2,478,326, a system is described for transporting bulk materials which have a tendency to adhere to the inside wall of the conduit. In this patent, the conduit consists of a plurality of sections which are connected by flange ends in end to end relationship. Each of the sections consists of a rigid outer and an elastic inner tube wherein the spaces formed between the outer and inner tube are separately linked through respective piping with the pressure and suction side of a pneumatic compressor. The connecting piping is provided with solenoid operated valves so that each space between the inner and outer tubes can be provided with either a higher pressure than that prevailing in the conveyor line itself or is subjected to periodic surges so that elastic inner tube vibrates. The installation described in this U.S. patent is extremely expensive, particularly for very long conveyor lines, without even eliminating the danger of plugs or blockages, as a particular result of the flaking of the wall deposits.

It is the object of the present invention to provide a system for the pneumatic conveying of bulk material which is improved, over the known prior installations with respect to its functional safety and the ability to facilitate the pneumatic transport over extended stretches.

It is a further object of the present invention to provide a pneumatic conveying system capable of handling bulk materials which are normally handled only with great difficulty. In particular, it is the object of the present invention to provide a pneumatic conveying system which automatically recognizes and clears blockages or plugs and which provides a simple measure for preventing the deposit of the bulk material on the inner walls of the conveyor.

It is the further object of the present invention to provide for the recognition and detection of leaks within the conveying system or the creation of excess porosity and/or openings in the elastic inner tube, which as experience has shown can never be completely eliminated, due to the inherent nature of the elastic inner tube material.

The foregoing together with other objects will be apparent from the following disclosure of the present invention.

SUMMARY OF THE INVENTION

According to the present invention bulk material is pneumatically transported through a transport conduit having a secondary gas line through which pure gas or air is conveyed. The secondary gas line is connected to the transport conduit at selected intervals by a series of check valves responsive to a difference in pressure between that in the transport conduit and that in secondary gas line to divert gas to the transport conduit to enhance the transport of the bulk material therethrough as well as the removal of any blockage or flaking material found in the transport conduit. Pressure relief valves are also connected between the secondary gas line and the transport conduit at selected intervals between multiple ones of the check valves.

The transport conduit comprises a plurality of tubular sections connected end to end. Each of the sections comprise a rigid outer tube and an elastic inner tube having an outer diameter smaller than the inner diameter of the outer tube and which is hermetically sealed at each of its ends to the outer tube to form an enclosed annular chamber therebetween. The chamber of each of the conduit sections are serially connected by a bridging hose line with each of the next adjacent conduits sections and the chamber of at least the first and last sections in the transport conduit is opened to atmosphere. Preferably, the bridging hose lines are at least partially transparent so that any leak or break in the inner elastic tube, will be apparent by observing any material residue in the brdging line. The opening of the terminal chambers to atmospheric is made through a filter so that any dust in the ambient air or rain or water will not enter into the hermetically sealed chambers.

Various details of the present invention particularly with regard to the connection of the conduit sections to each other or the connection of the check and relief valves are set forth in the following description and in the illustration of the preferred form of the invention contained in the accompanying drawings.

BRIEF DESCRIPTION OF THE DRAWINGS

In the drawing:

FIG. 2 is a longitudinal cross-sectional view through a linear section of the transport conduit and associated secondary gas lines, FIG. 3 is a sectional view taken lines III—III of FIG. 2, and FIG. 4 is a enlarged view in detail of the area of FIG. 2 contained in the circle IV.

DESCRIPTION OF THE INVENTION

Figure 1:
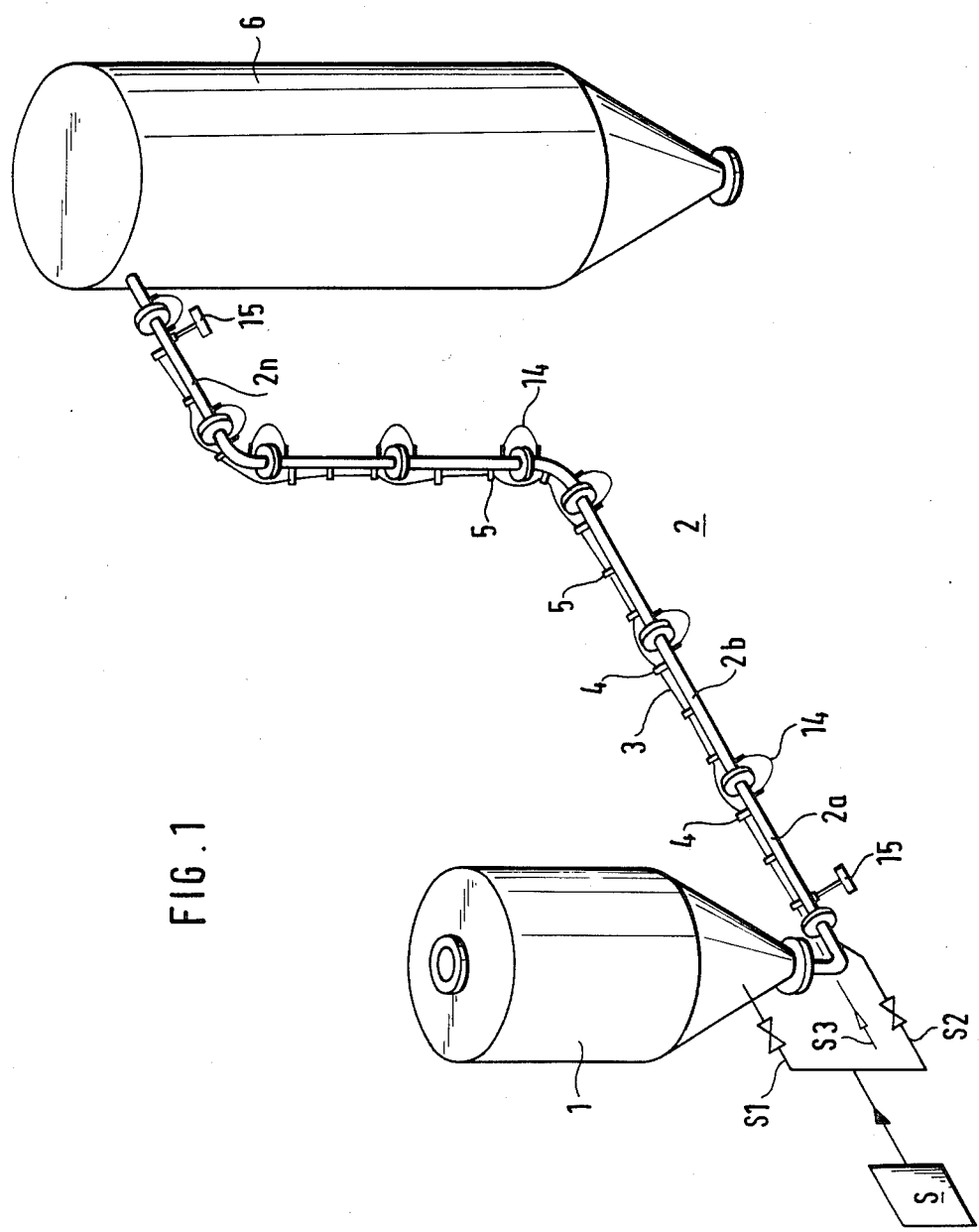
FIG. 1 is a schematic view showing a pneumatic transport system embodying the present invention.

In FIG. 1 an installation, for the pneumatic transport of a bulk material embodying the present invention, is schematically shown consisting of a loading station 1, such as a storage hopper in which a large quantity of the bulk material is contained. The material is fed from the loading station 1 into the transport conveyor conduit 2. Such a feeding is carried out in the manner conventional to the art as for example, by forming the loading station 1 as a pressure container, to which air is fed as indicated schematically, or by providing the outlet of the loading station with a conventional cellular wheel or sluice.

As schematically shown, pressurized carrier gas under pressure is delivered from a conventional source S to a line S1 directly to the loading station 1, should the same be a pressure container, and/or through S2 directly into the transport conduit 2. In either case, the bulk material is entrapped within the flowing pressurized gas and is transported therein through the conduit 2. The terms gas and air are used in this text synomously. Preferably, subject to modification depending on the material being transported, pure air is to be used as the carrier gas. The pressurized gas is also fed from the same source S or from a separate source (not shown) to a secondary gas line 3 which runs parallel to the transport conveyor 2 along its entire length.

The transport conveyor 2 is formed of a plurality of sections 2a, 2b ... 2n, which are connected in series end to end. The secondary gas line 3 is similarly subdivided into sections by associated check and relief valves 4 and 5 respectively which are connected at selected intervals with the conveyor 2 so that each of the transport conduit sections has associated with it at least one check valve. The relief valves are spaced at greater intervals between the check valves. The terminal of the conduit 2 ends in a receptable 6 which, for example, may be a separator, silo or the like.

As seen in FIG. 2, each of the conduit sections 2a, 2b ... 2n, consists of a rigid outer tube 10, made of metal or plastic and an elastic inner tube 11, which may be formed of a rubber or resilient plastic hose. In the pressureless state the eastic inner tube 11 has an outer diameter which is smaller than the inside diameter of the rigid outer tube 10. The inner tube 11 is hermetically connected at both of its ends to the exterior of the rigid tube 10 so that a closed annular chamber 12 is created between the rigid tube 10 and the inner tube 11. Each chamber is connected with its next adjacent chamber, up or down the entire transport conveyor, by a small bore fitting 13 formed in the wall of the rigid tube 10 into which a small, at least partially transparent, plastic hose 14 is attached. This does not apply, however, to the chambers 12 of the first and last conduit sections in the conveyor which, as seen in FIG. 1, communicate with the atmosphere via a filter 15 adapted to permit passage of air while preventing the entry of dust, water and the like into the chambers 12. The serial bridging of the annular chambers 12 enables these chambers to be maintained in the pressureless state by being open to atmosphere at least at their end so that the elastic inner tube 11 is free to move readily relative to the outer tube responsive to the flow of bulk material through it.

The fittings by which the check and relief valves 4 and 5 respectively are connected to the interior of the transport conduit sections is also shown in FIG. 2. Each fitting comprises a nipple 16, threaded on its exterior and interior surfaces, inserted from the interior of the conduit through a hole in both the elastic inner tube 11 and the outer rigid tube 10. The nipple 16 is provided with a radially extending flange 16a which is in cross-section adapted to the contour of the rigid outer tube so as to clamp between it and the outer tube the elastic inner tube 11. Washers 16b and 16c, of an elastic material, are placed between the flange 16a and the elastic inner tube 11 and on the outer surface of the outer tube 10 respectively. Finally, a nut 16d is threaded over the outer end of the nipple 16 clamping the washers, the rigid outer tube and the elastic inner tube in a secure firm hermetically sealed connection. The respective valves are thereafter screwed into the nipple 16.

In order to prevent bulk material from being deposited in the area below the valve and around the interior of the nipple 16, an annular ring 16e, of an elastic plastic material, is inserted into the inner surface of the nipple as seen in FIG. 4. This latter ring 16e creates a smooth surface transition between the clear opening of the nipple 16 and the check or relief valve which is screwed into the interior of the nipple. It also serves as shoulder against which the valve is seated. The radial flange 16a of the nipple can also be coated with a plastic material (not shown in the drawing) if desired to decrease frictional resistance.

Each of the elastic inner tubes 11 is hermetically sealed with respect to the rigid tube 10 and with the next adjacent conduit section by a flange connection also shown in FIG. 2. Welded to the outer face of the rigid tube 10 immediately adjacent each of its axial ends is a rigid ring 17 and 17a respectively, over which the extending ends 11a of the elastic inner tube is folded, first radially outward, and then axially. The folded ends of the elastic inner tubes, in adjacent conduit sections are held in place against a centering washer 18, which is provided with a concave face on both sides. Seated on each of the respective folded ends 11a of the elastic inner tube 11 and pressing the same also against the rigid ring 17, is a tensioning ring 19 and 19a, respectively, behind which is seated a disk flange 20 and 20a which is adapted to move the tensioning rings 19, 19a axially against the rigid ring 17. Flanges 20 and 20a of the abutting ends are bolted together by a screw or bolt (not shown) so that the ends 11a of the overlapping elastic inner tube are squeezed against the rigid rings 17 and 17a and held in place by the associated tensioning rings 19 and 19a against the centering ring 18.

The system as described functions as follows:

Since the elastic inner tube 11 has a diameter smaller, in the pressureless state, than that of the rigid outer tube 10, the inner elastic tube 11 is normally separated from the wall of the outer tube. It however, expands at the start of the pneumatic transport of the bulk material, as a result of the increased internal pressure, and comes to abut against the outer rigid tube 10. A difference, which is both practicable and effective in the diameter of the elastic inner tube 11 relative to the diameter of the rigid outer tube is between 10 to 20 percent. As the inner tubes 11 expand the air within the respective chambers 12 is displaced and escapes serially through the bridging hoses 14 until it reaches the endmost conduit sections wherefrom it escapes to the atmosphere. Should there be any leak or tear in any one of the elastic inner tubes 11, the degree of such leak or tear will be seen from the soiling of the filter 15. It will also be possible to locate the point of leakage, substantially exactly, by viewing the transparent sections of the bridging hoses 14 since the leakage in the corresponding conduit section would soil that hose as well. Depending upon the overall length of the conveyor system, it may be practical to install additional filters or dust separators at intervals within the bridging hoses 14 for the purpose of preventing cross over of bulk material from one section to another arising from a leak or tear in the inner tube. This may be more practical than having to shut the system down and make the necessary complicated repair.

Should the transported bulk material be deposited because of its inherent characteristics, onto the inside wall of the elastic inner tube, such deposits will flake off automatically without any interruption in the pneumatic transport since the elastic inner tube will automatically contract to its smaller diameter in the pressureless state due to corresponding rythymic changes in the transport. The air that is necessary to fill the chambers 12 upon such contraction flows automatically via the filter 15 and passes serially through each of the conduit sections via the connecting bridges 14. It is preferable to interrupt the transport operation periodically. Such periods can be determined, according to empirical values derived from the nature of the material to be transported so that the wall deposits do not have an opportunity to so harden that they will not flake off readily. The flake can be subsequently transported into the receiving receptacle after resumption of the transport.

The check valve 4 and releif valve 5 are responsive to a difference in pressure between that the inner tube of the transport conduit and that in the secondary gas line so that when either the pressure is too high or too low in the transport conduit, air pressure will be released through the relief valve or introduced through the check valve directly into the thransporting media. Thus, during conveyance of the bulk material, the check and relief valves are automatically placed in operation whenever the pressure value within the associated conduit sections falls and/or rises above predetermined values set for the valves. In this way, movement of the bulk material through the conveyor is enhanced and blockage is prevented or removed before they cause a breakdown in the conveying operation.

Various modifications, changes and embodiments have been discussed and disclosed in the foregoing description. Other such changes and modifications will be apparent to those skilled in this art. Accordingly, it is intended that the present disclosure be taken as illustrative only and not limiting the scope of the invention.

What is claimed is:

1. A pneumatic conveying system for bulk material comprising a transport conduit through which said bulk material is pneumatically transported, said transport conduit comprising a plurality of tubular sections connected end to end, each section comprising a rigid outer tube and an elastuc tube having an outer diameter smaller than the inner diameter of said outer tube, and a secondary gas line paralleling said transport conduit, check and relief valves connecting said secondary gas line to the interior of the inner tube at selected intervals, said check and relief valve communicate through the walls of said outer and inner tube to be responsive to a different in pressure between that within the inner tube and that within said secondary gas line to divert gas to or from the interior of said inner tube to enhance the transport of said bulk material therethrough, said elastic inner tube being hermetically sealed at each end to said outer tube and to each of said check and relief valves to form an enclosed chamber between said inner and outer tubes, hermetically separated from the interior of said inner tube and from said secondary gas line, a bridging tube connecting the chambers of each one said conduit sections serially with the chamber of each of the next adjacent conduit sections, the chambers of at least the terminal conduit sections in said transport conduit being opened to atmosphere to permit air at atmospheric pressure to move serially through said chambers from one end of said transport conveyor to the other.

2. The system according to claim 1, wherein said bridging tube is at least in part transparent.

3. The system according to claim 1, wherein said bridging tube is formed of a plastic hose.

4. The system according to claim 1, including means for filtering the air passing serially through the chambers.

5. The system according to claim 1, wherein said conduit sections are provided with means at each end for sealingly connected adjacent conduit sections, comprising:
- a rigid ring welded to the face of the outer tube at the end of said outer tube, and around which the associated elastic inner tube is folded;
- a centering seal ring having two concave front surfaces arranged to abut against the folded inner tube and to be abutted to the folded inner tube of the next adjacent conduit section;
- a tensioning ring seated co-axially over said conduit section inwardly of the rigid ring and the folded inner tube; and
- a flange seated co-axially over said conduit inwardly of the tensioning ring and fastened to the flange of the next adjacent conduit section by a bolt, whereby the rigid rings and folded elastic tubes of adjacent conduit sections are fixedly compressed.

6. The system according to claim 1, wherein the valves are connected by fittings comprising a nipple which is inserted from the interior of said conduit sections into aligned holes in the inner tube and the outer tube, said nipple being provided with a radial flange adapted to the contour of the inner surface of the conduit section, said nipple being clamped to said conduit section by a nut threaded about the exterior of said nipple into engagement with said conduit section.

7. The system according to claim 6, wherein said valves are threaded into said nipples, said nipple being provided with an elastic seal ring against which said valve seats.

* * * * *